United States Patent
Pickens et al.

(10) Patent No.: US 8,214,855 B2
(45) Date of Patent: Jul. 3, 2012

(54) DELIVERY OF STREAMS TO REPAIR ERRORED MEDIA STREAMS IN PERIODS OF UNRECOVERABLE ERRORS

(75) Inventors: John Pickens, Newark, CA (US); William C. VerSteeg, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 710 days.

(21) Appl. No.: 11/951,544

(22) Filed: Dec. 6, 2007

(65) Prior Publication Data

US 2009/0150960 A1 Jun. 11, 2009

(51) Int. Cl.
- H04N 7/10 (2006.01)
- H04N 7/025 (2006.01)
- G06F 11/00 (2006.01)
- G11C 29/00 (2006.01)

(52) U.S. Cl. ............. 725/32; 725/105; 714/2; 714/710

(58) Field of Classification Search .............. 725/32, 725/105; 714/2, 710
See application file for complete search history.

(56) References Cited

U.S. PATENT DOCUMENTS

| | | | |
|---|---|---|---|
| 6,031,818 A | 2/2000 | Lo et al. | 370/216 |
| 7,289,500 B1 | 10/2007 | Amlekar | 370/390 |
| 7,301,944 B1 * | 11/2007 | Redmond | 370/390 |
| 8,154,988 B2 | 4/2012 | Pickens et al. | |
| 2002/0071407 A1 | 6/2002 | Koo et al. | 370/335 |
| 2003/0046032 A1 | 3/2003 | Puthiyedath | 702/188 |
| 2003/0070172 A1 * | 4/2003 | Matsuzaki et al. | 725/87 |
| 2004/0135676 A1 | 7/2004 | Berkman et al. | 340/310.01 |
| 2005/0050424 A1 * | 3/2005 | Matsuura | 714/748 |
| 2005/0216812 A1 | 9/2005 | Leon et al. | 714/748 |
| 2005/0271083 A1 | 12/2005 | Spinoso | 370/466 |
| 2005/0281212 A1 | 12/2005 | Jeong et al. | |
| 2006/0005099 A1 | 1/2006 | Strasman et al. | 714/746 |
| 2006/0114936 A1 | 6/2006 | Paffen | 370/469 |
| 2006/0209837 A1 | 9/2006 | Lee et al. | 370/394 |
| 2006/0282739 A1 | 12/2006 | Meyer et al. | |
| 2007/0011237 A1 | 1/2007 | Mockett | 709/204 |
| 2007/0237185 A1 | 10/2007 | Pereira et al. | 370/503 |
| 2007/0263628 A1 | 11/2007 | Axelsson et al. | 370/392 |
| 2008/0056140 A1 | 3/2008 | Shida et al. | 370/242 |
| 2009/0150715 A1 | 6/2009 | Pickens et al. | |

FOREIGN PATENT DOCUMENTS

| | | |
|---|---|---|
| WO | WO 01/43440 A1 | 6/2001 |
| WO | WO 2005/076623 A2 | 8/2005 |
| WO | WO 2006/101979 A2 | 9/2006 |
| WO | WO 2009/018118 A1 | 2/2009 |

OTHER PUBLICATIONS

U.S. Final Office Action dated Feb. 17, 2010 cited in U.S. Appl. No. 11/951,592.

(Continued)

*Primary Examiner* — Dominic D Saltarelli
(74) *Attorney, Agent, or Firm* — Merchant & Gould (57) ABSTRACT

In one embodiment, a method includes receiving a program stream from a program source on a first channel. The method also includes detecting an unrecoverable error in the program stream, and receiving a standalone decodable repair stream from an error repair source on a second channel. The repair stream refers to a portion of the program stream, where the portion corresponds to the unrecoverable error. The method also includes combining the repair stream and the program stream to produce a presentable stream for user viewing.

18 Claims, 11 Drawing Sheets

OTHER PUBLICATIONS

U.S. Office Action dated Aug. 24, 2010 cited in U.S. Appl. No. 11/951,592.
International Search Report dated Jul. 6, 2009 cited in Application No. PCT/US2008/085234.
Igor D.D. Curcio, Nokia Corporation, "Point-to-Point Repair for MBMS Downloading," Tdoc S4-040092, 3GPP TSG-SA4#30 Meeting, Feb. 23-27, 2004, XP-002375820.
International Search Report dated Jul. 6, 2009 cited in Application No. PCT/US2008/085237.
U.S. Office Action dated Sep. 9, 2009 cited in U.S. Appl. No. 11/951,592.
U.S. Final Office Action dated Feb. 28, 2011 cited in U.S. Appl. No. 11/951,592.

* cited by examiner

DELIVERY OF STREAMS TO REPAIR ERRORED MEDIA STREAMS IN PERIODS OF UNRECOVERABLE ERRORS

CROSS REFERENCE TO RELATED APPLICATIONS

The present U.S. application is related to the U.S. application Ser. No. 11/951,592 entitled "DELIVERY OF STREAMS TO REPAIR ERRORED MEDIA STREAMS IN PERIODS OF INSUFFICIENT RESOURCES", which is incorporated herein by reference, and which has been filed concurrently with the present application.

TECHNICAL FIELD

The present disclosure relates generally to delivery of media streams to subscribers.

BACKGROUND

Errors often occur when delivering media streams to subscribers, for various reasons. Conventional techniques for repairing errors in media streams, or recovering from errors in media streams, include forward error correction (FEC) and retransmission. However, conventional techniques are unable to address scenarios where the error rate is higher than expected, and when network or subscriber resources are unavailable for relatively long periods of time. Although the entire program could be retransmitted in these scenarios, such retransmissions make inefficient use of network resources. Thus, a need arises for these and other problems to be addressed.

OVERVIEW

In one embodiment, a method comprises receiving a program stream from a program source on a first channel. The method also comprises detecting an unrecoverable error in the program stream, and receiving a standalone decodable repair stream from an error repair source on a second channel. The repair stream refers to a portion of the program stream, where the portion corresponds to the unrecoverable error. The method also comprises combining the repair stream and the program stream to produce a presentable stream for user viewing.

In another embodiment, an apparatus comprises memory and a processor. The memory stores program code. The processor is programmed by at least the program code to receive a program stream from a program source on a first channel. The processor is also programmed to detect an unrecoverable error in the program stream, and receive a standalone decodable repair stream from an error repair source on a second channel. The repair stream refers to a portion of the program stream, where the portion corresponds to the unrecoverable error. The processor is also programmed to combine the repair stream and the program stream to produce a presentable stream for user viewing.

In another embodiment, an apparatus comprises a means for receiving a program stream from a program source on a first channel. The apparatus also comprises means for detecting an unrecoverable error in the program stream, and means for receiving a standalone decodable repair stream from an error repair source on a second channel. The repair stream refers to a portion of the program stream, where the portion corresponds to the unrecoverable error. The apparatus also comprises means for combining the repair stream and the program stream to produce a presentable stream for user viewing.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DESCRIPTION OF EXAMPLE EMBODIMENTS

Figure 1:
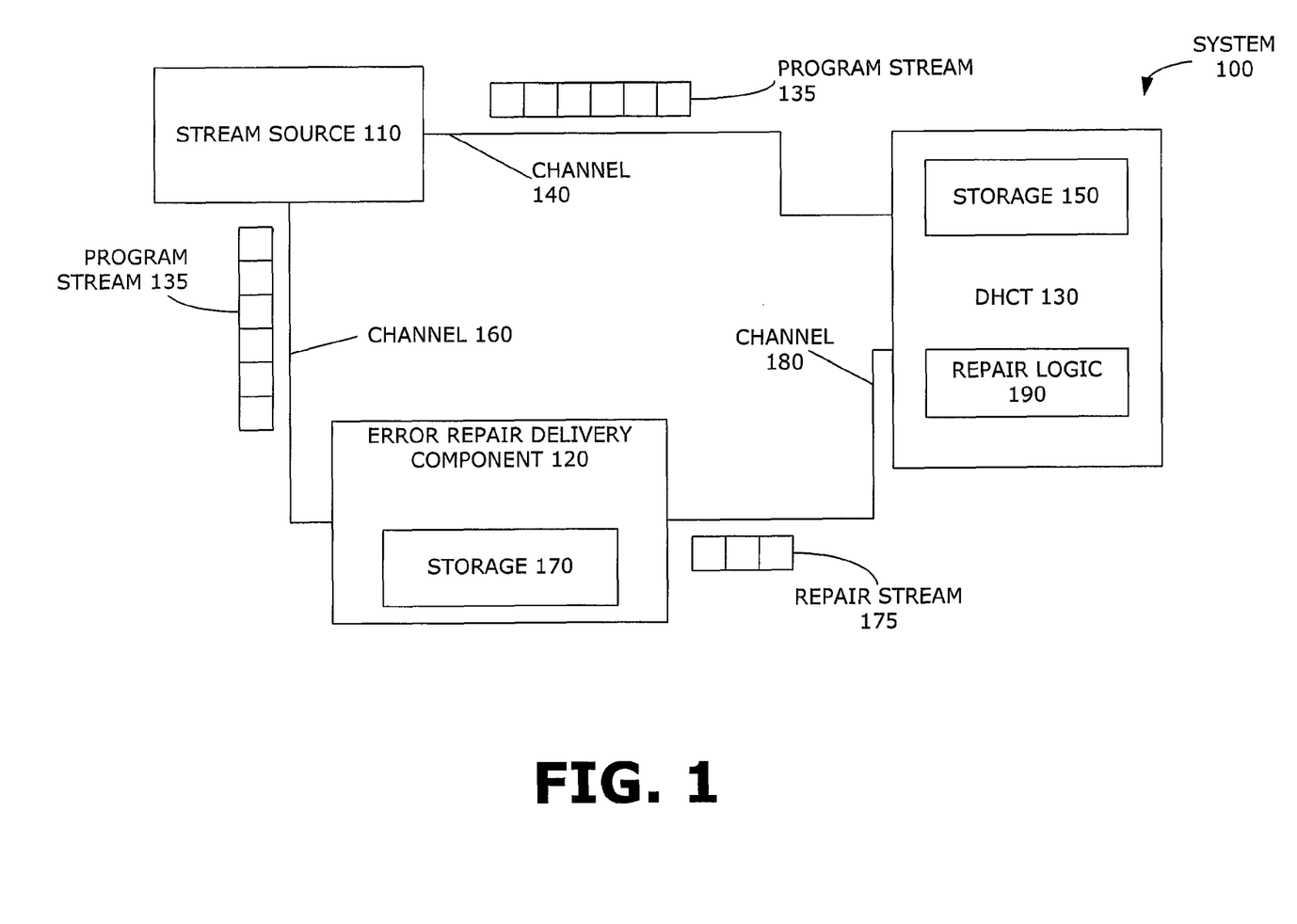
FIG. 1 is a block diagram of one embodiment of a system and method to deliver variable delay repair streams for media streams with extended errors.

FIG. 1 is a block diagram of one embodiment of a system and method to deliver repair streams for media streams with extended errors. System 100 includes a program stream source 110, an error repair delivery component 120, and a digital home communication terminal (DHCT) 130. In some embodiments, DHCT 130 takes the form of a set-top box. Stream source 110 provides a program stream 135 to DHCT 130 over logical channel 140. DHCT 130 stores at least at a portion of the received program in storage 150, for retrieval and/or playback. Typically, the storage capabilities contained within stream source 110 and/or error repair delivery component 120 are many orders of magnitude higher than the storage contained in DHCT 130.

In this disclosure, program stream 135 is a media stream such as audio or audio/video, that is stored by DHCT 130 and eventually consumed by a subscriber. One example is a digital encoding of broadcast TV channels such as ABC or NBC. In this disclosure, logical channel 140 implements a multicast or unicast delivery of program stream 135. Program stream 135 is typically encoded, and example encoding formats include MPEG2 and H.264 AVC. Example transport stream delivery formats on logical channel 140 are MPEG-TS-UDP and MPEG-TS-RTP.

Stream source 110 also provides program stream 135 to error repair delivery component 120 over logical channel 160. Error repair delivery component 120 acquires program stream 135 and stores at least a portion of the program in storage 170. For purposes of this disclosure, it is assumed that errors on logical channel 160 are correctable, or that the degree of error correction capability is equivalent to the reliability of delivery via logical channel 160. Typically, this assumption is reasonable, since either error repair delivery component 120 is located relatively close to stream source 110, with a small number of intervening components and connections, or a reliable method of repairing errors across the link is implemented. Specific techniques used for reliable error repair on logical channel 160 should be familiar to a person of ordinary skill in the art, so will not be discussed further in this disclosure.

Between transmission at stream source 110 and reception at DHCT 130, portions of program stream 135 may be affected by various error conditions, which result in content that is not received by DHCT 130, or that has unrecoverable errors at DHCT 130. In such cases, error repair delivery component 120 uses program stream 135 in storage 170 to provide the affected content to DHCT 130 as segmented repair stream 175, over logical channel 180. In some embodiments, segmented repair stream 175 is delivered at a lower rate or lower class of service than program stream 135, or even as best effort. Segmented repair stream 175 can be delivered to DHCT 130 after a variable amount of delay, on the order of seconds, minutes, hours, or longer, depending on the characteristics of the path.

DHCT 130 stores received segmented repair stream 175 in storage 150. Repair logic 190 within DHCT 130 combines content within segmented repair stream 175 with content within program stream 135 to produce a corrected program, available for retrieval and/or playback. This method allows the subscriber to view segments of the program which were affected by the error conditions, and also uses bandwidth efficiently because it avoids retransmitting the entire program. Storage 150 at DHCT 130 enables seamless presentation of content even if an extended outage occurs while the presentation was time shifted or paused. What the subscriber sees when consuming the program depends on the time that has elapsed between receiving errored program stream 135 and consuming the program. For example, a subscriber may see gaps or a freeze in the display if he consumes the stream immediately after the stream is received, when the repair is not yet complete. As the viewing delay increases, the probability of seeing a seamless stream increases, as some segments are repaired on the fly, and some repaired segments are supplied from memory or disk. When the viewing is delayed enough, the subscriber can access a completely corrected program, so the program appears to the viewer as a continuous stream.

Missing or errored content which results in transmission of segmented repair stream 175 may be detected by error repair delivery component 120 or by DHCT 130. This includes content received by DHCT 130 that contains errors that are unrecoverable through FEC and/or retransmission techniques (e.g., the number of errors exceeds the strength of the FEC code). This also includes program content that is not received at all by DHCT 130. Missing or errored content may be a result of a variety of conditions. Some instances of missing or errored content are caused by conditions on the backbone or access network, such as network congestion, or outages due to power or equipment failure. Other instances of missing or errored content are caused by conditions at the subscriber location, such as congestion on the subscriber link, outage on the subscriber link, or power or equipment failure at the subscriber location. The techniques described herein can therefore be used to repair conditions which occur over extended periods of time, on the order of seconds, minutes, hours, days, weeks, months, or years (depending on storage resources). Note that error repair delivery component 120 can be used with other forms of error repair, such as FEC and/or retransmission techniques.

The techniques disclosed herein also address missing or errored content due to insufficient subscriber resources. One example of insufficient subscriber resources includes the scenario of attempting to record a program at a time all tuners are currently subscribed to other record requests or services (e.g., live viewing, electronic program guide (EPG) download). Another example of insufficient subscriber resources includes the scenario of attempting to record a program at a time when subscriber link bandwidth is insufficient because the bandwidth has been allocated for other record requests or services. Yet another example includes the scenario of attempting to record a program at a time when a tuner or sufficient link bandwidth was expected to be available, but is not available because the program actual start time is different than the start time in the published EPG schedule. Tuner is to be understood as functionality enabling receipt of media, and availability is to be understood as encompassing available bandwidth as well as other resources within the DHCT.

In some embodiments, segmented repair stream 175 is the same type of stream as program stream 135, but simply contains less content. For example, if program stream 135 is an MPEG transport stream containing an entire program, then segmented repair stream 175 is also an MPEG transport stream, but containing only segments of the program that were affected by errors. In some embodiments, segmented repair stream 175 contains all the content included in program stream 135, so that segmented repair stream 175 could be used on its own when DHCT 130 missed the entire program. In some embodiments, segmented repair stream 175 is instead provided using retransmission techniques, FEC techniques, or both. In these cases, segmented repair stream 175 is received in less-than-real-time, thus reducing the load on network and component resources.

For ease of illustration and explanation, stream source 110 is shown in FIG. 1 as producing a single program stream 135. However, a person of ordinary skill in the art should understand that stream source 110 typically generates multiple program streams which are delivered to multiple subscribers. Similarly, error repair delivery component 120 typically ingests multiple program streams, any one of which can be used to generate a corresponding repair stream for delivery to a particular subscriber. A person of ordinary skill in the art should also realize that error repair delivery component 120 typically stores ingested programs for a period of time (which could range from minutes to weeks, limited, for instance, by storage space), and a repair stream for a particular program stream can be generated during this period of time.

A person of ordinary skill in the art should also appreciate that logical channels 140, 160, 180 can be implemented using a variety of network architectures, but for purposes of explaining the concepts of system 100, this disclosure focuses on the channels as logical constructs. Further details of an example system architecture is discussed later in connection with FIG. 10.

The transmission rate and Quality of Service (QoS) characteristics of segmented repair stream 175 are independent of the rate and characteristics of corresponding program stream 135. In some embodiments, the transmission rate and/or QoS characteristics of segmented repair stream 175 are selected based on bandwidth and other resource parameters which are learned by error repair delivery component 120. In one embodiment, the delivery of segmented repair stream 175 is best-effort. In another embodiment, error repair delivery component 120 learns or configures (e.g., via resource reservation protocol (RSVP)) bandwidth and transmits at a guaranteed rate, lower, equal, or higher than the bandwidth of the original stream.

The time at which error repair delivery component 120 provides segmented repair stream 175 could vary. In some embodiments, segmented repair stream 175 is generated once a threshold number of errored or missing packets have been reported, and is transmitted to the reporting DHCT 130 upon generation. In other embodiments, segmented repair stream 175 is generated once a threshold number of errored or missing packets has been reported, but delivery to the reporting DHCT 130 is delayed, for example, until network bandwidth and/or resources are sufficient to deliver segmented repair stream 175, or until DHCT bandwidth or DHCT resources are sufficient to receive and process segmented repair stream 175. In yet another embodiment, generation of segmented repair stream 175 is delayed until error repair delivery component 120 has sufficient resources available to generate the stream.

Figure 2:
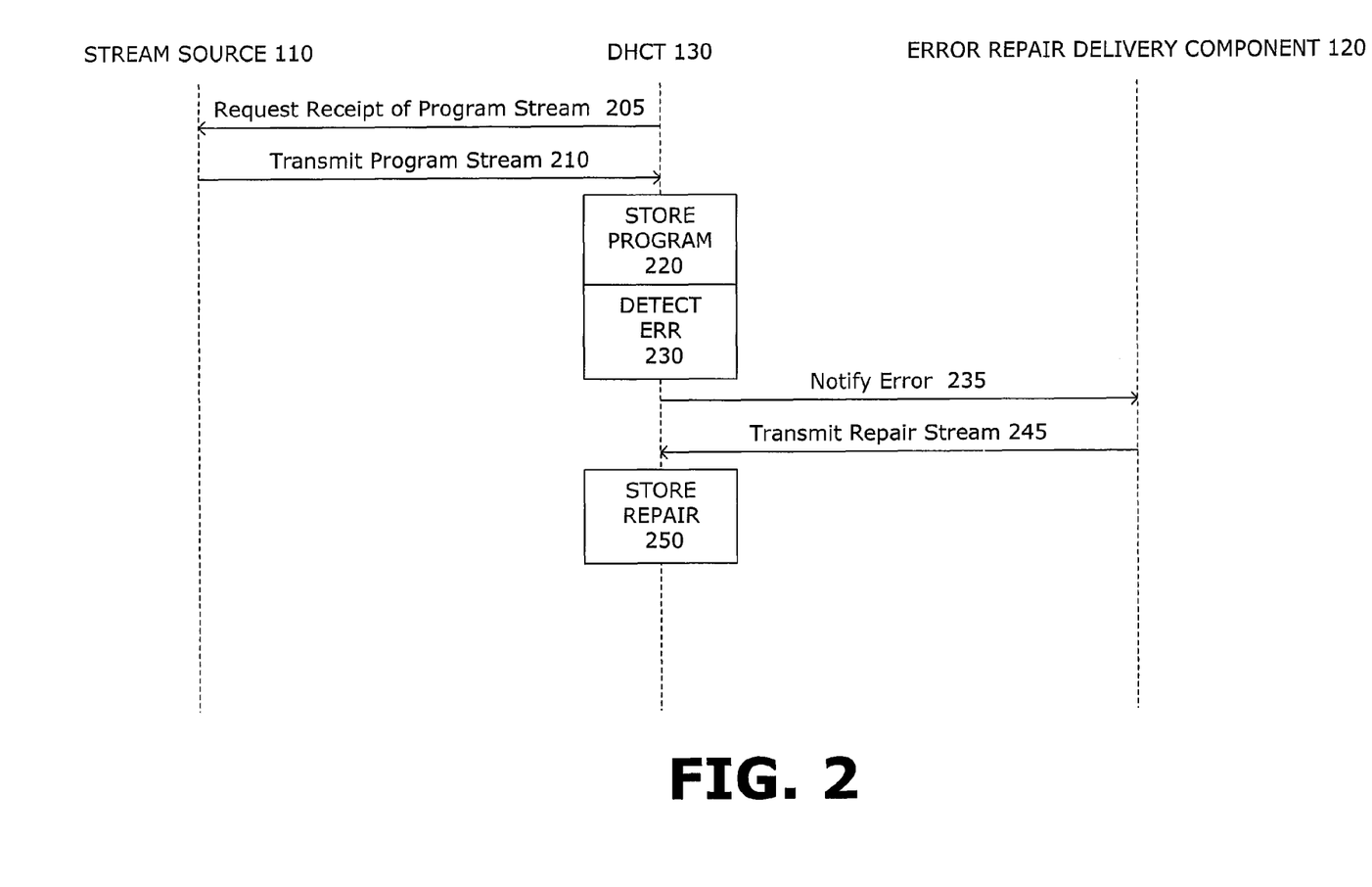
FIG. 2 is a message flow diagram illustrating interactions between various components of FIG. 1, in one example scenario.

FIG. 2 is a message flow diagram illustrating interactions between the components of FIG. 1 in one example scenario. DHCT 130 initiates (205) an operation that causes a program stream 135 to be received from stream source 110 (e.g., IGMP Join). Stream source 110 provides (210) the requested program stream 135, which is stored (220) by DHCT 130. In this scenario, DHCT 130 detects (230) an error condition in received program stream 135, and in response, DHCT 130 notifies (235) error repair delivery component 120 of the error condition. In another embodiment, error repair delivery component 120 polls DHCT 130 for error notifications.

Error repair delivery component 120 provides (245) a segmented repair stream 175 that corresponds to the errored portion of program stream 135, as determined by information in the error notification 235. Although not shown in FIG. 2, some embodiments of error repair delivery component 120 communicate with DHCT 130 to learn what programs are being consumed by DHCT 130.

DHCT 130 stores (250) the segmented repair stream 175 for later use. In some embodiments, error repair delivery component 120 determines a time at which bandwidth and resources are available to repair the stream, and defers processing of error notifications 235 until this time.

Figure 3:
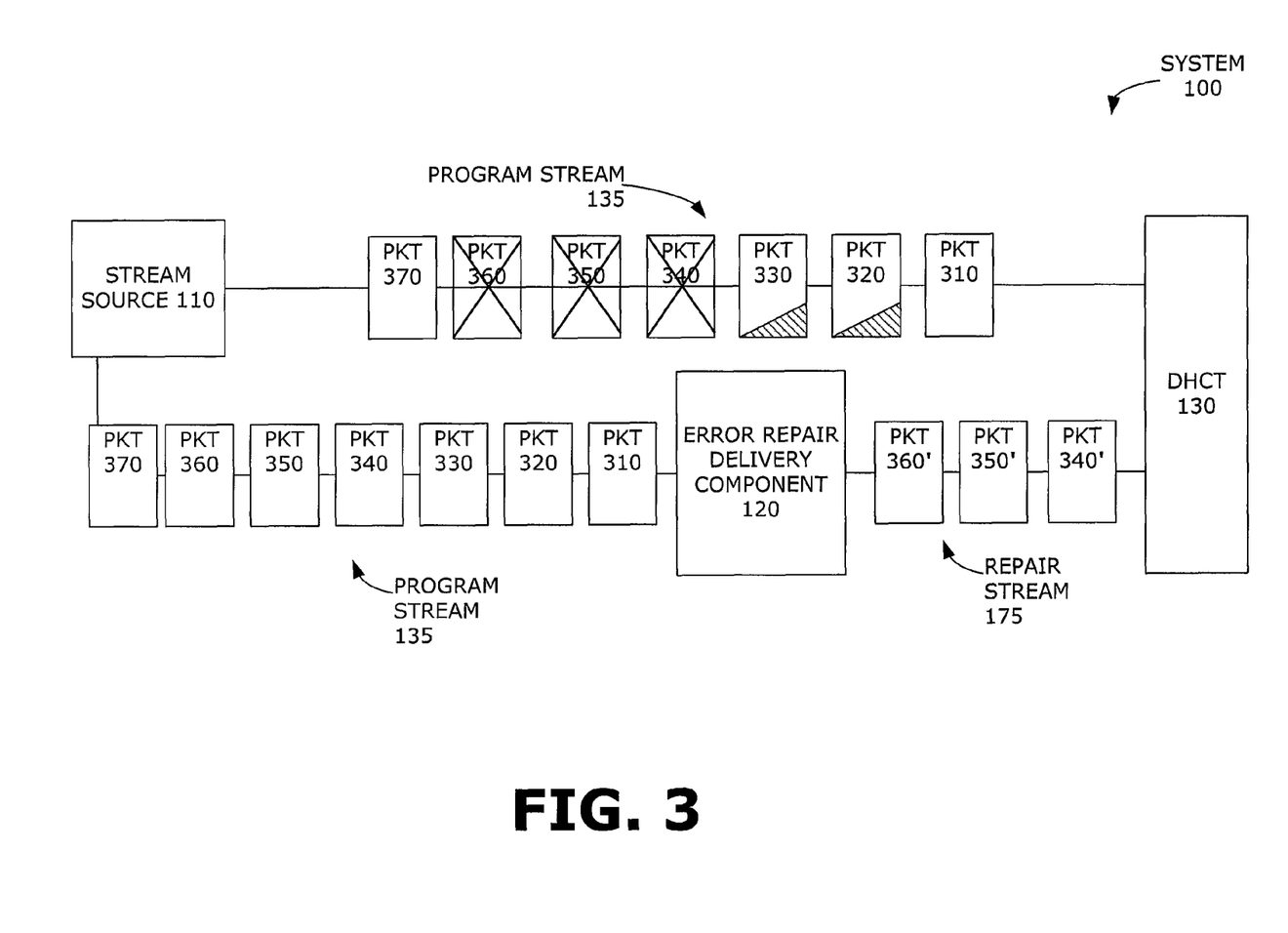
FIG. 3 is a data flow diagram illustrating interactions between various components of FIG. 1, in one example scenario.

FIG. 3 is a data flow diagram illustrating interactions between the components of FIG. 1 in one example scenario. Stream source 110 transmits a program stream 135 to DHCT 130. In this example scenario, program stream 135 contains seven packets that are transmitted to DHCT 130. The first packet 310 has no errors. The next two packets, 320 and 330, experience errors (symbolically represented by an "X"), but the number of errors is correctable by an FEC/retransmission mechanism present in the network (e.g., the retransmission window is greater than two packets). Therefore, DHCT 130 takes no action to request a repair stream.

The next three packets, 340-360, experience errors (symbolically represented by an "X") which are not correctable by an FEC/retransmission present in the network. Therefore, error repair delivery component 120 provides DHCT 130 with a segmented repair stream 175 which includes content corresponding to the errored packets, shown here as packets 340', 350', and 360'. Finally, DHCT 130 also receives another non-error packet, 370.

Note that error repair delivery component 120 is able to produce segmented repair stream 175 because error repair delivery component 120 is also provided with the original program stream 135 over logical channel 160. For purposes of this disclosure, it is assumed that logical channel 160 is error-free.

Figure 4:
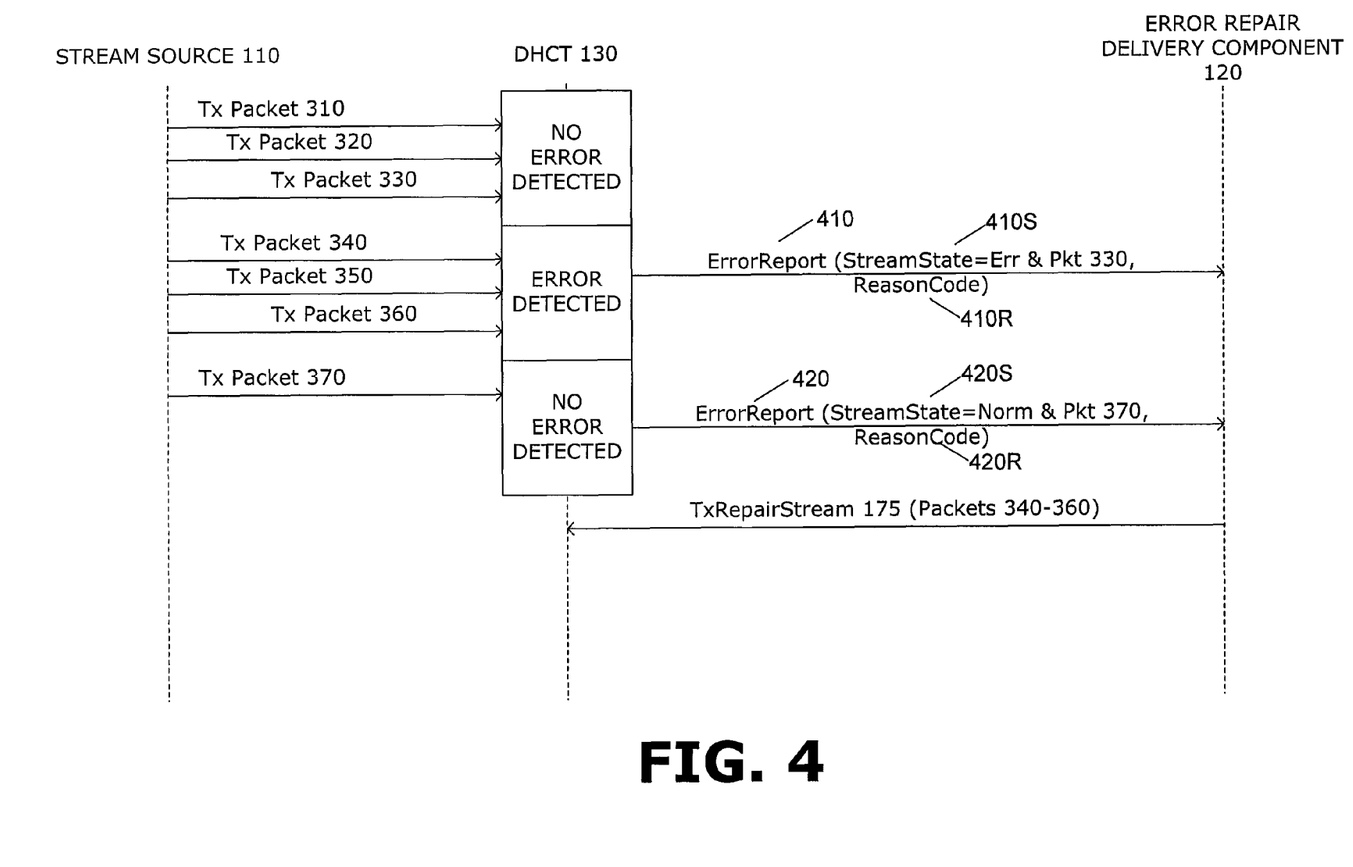
FIG. 4 is a message flow diagram showing more detail on the component interactions in the example scenario of FIG. 3.

FIG. 4 is a message flow diagram showing more detail on the component interactions in the example scenario of FIG. 3. When DHCT 130 sends a notification to error repair delivery component 120, error repair delivery component 120 determines a time to begin sending the repair stream, which can be immediate, or later.

Stream source 110 transmits packets 310-340 to DHCT 130, and the packets are received and stored. As described earlier, some of these packets have errors, but these errors are corrected by FEC/retransmission before storage. DHCT 130 examines the packets and tracks missing programs segments within the last time window (e.g., 1 minute). If new errors occur in the next time window, DHCT 130 keeps accumulating errors, up to a predefined threshold (e.g., number of errors, or number of time windows). When the threshold is reached (here, with receipt of packet 340), DHCT 130 notifies error repair delivery component 120 through a first error report 410, containing a stream state 410S and a reason code 410R. Stream state 410S indicates current condition and stream position. For first error report 410, the current condition is an error condition, so stream position identifies the most recent non-errored stream position (in this case, packet 340). In this example scenario, the reason code 410R indicates packet errors. Error report 410 can also contain information about DHCT bandwidth and resources.

DHCT 130 receives the next packet 350, which is also errored. However, since DHCT 130 has already reported an error condition, no report is generated. The same is true when DHCT 130 receives errored packet 360. DHCT 130 then receives non-errored packet 370. After determining packet 370 has no errors, DHCT 130 stores the non-errored packet. DHCT 130 also notifies error repair delivery component 120 through a second error report 420. In this second error report 420, stream state 420S indicates that the current condition is no longer errored, and the stream position identifies the most recent errored stream positions (in this case, packet 350).

In this example scenario, DHCT 130 issues second error report 420 in response to receiving packet 370 and determining that it has no errors. In other embodiments, second error report 420 is deferred to a later time (e.g., when DHCT 130 determines that the link outage or power outage is over), and until then, DHCT 130 continues to receive and store non-errored or error-correctable packets as before.

Error repair delivery component 120 collects error reports (from this and other DHCTs), and determines when to send segmented repair stream 175, for example, when component and network resources are available to repair the stream. At some point after error repair delivery component 120 provides segmented repair stream 175 to DHCT 130, DHCT 130 merges segmented repair stream 175 and errored program stream 135. Note that this merge may happen immediately or may be delayed, and the choice can depend on subscriber viewing behavior.

In some embodiments, segmented repair stream 175 contains a map of segments that are being retransmitted, and DHCT 130 processes this map. In this example, segmented repair stream 175 starts with the packet after the most recent non-errored stream position (given by stream state 410S in first error report 410), ends with the packet before the most recent errored stream position (given by stream state 420S in second error report 420), and contains all packets between those two positions. In this example scenario, segmented repair stream 175 therefore contains packets 340-360. After DHCT 130 receives segmented repair stream 175, DHCT storage contains all seven packets, 310-370, allowing DHCT 130 to reconstruct the program stream 135 as originally transmitted by stream source 110. In some embodiments, segmented repair stream 175 identifies error repair mappings at the transport packet level, e.g., by an RTP header sequence number. However, this disclosure is intended to cover any mechanism which allows DHCT 130 to precisely identify errored MPEG stream segments within program stream 135, and to unambiguously correlate these segments with segments carried in segmented repair stream 175. In some embodiments, error repair delivery component 120 retransmits other segments in addition to the errored segments.

Figure 5:
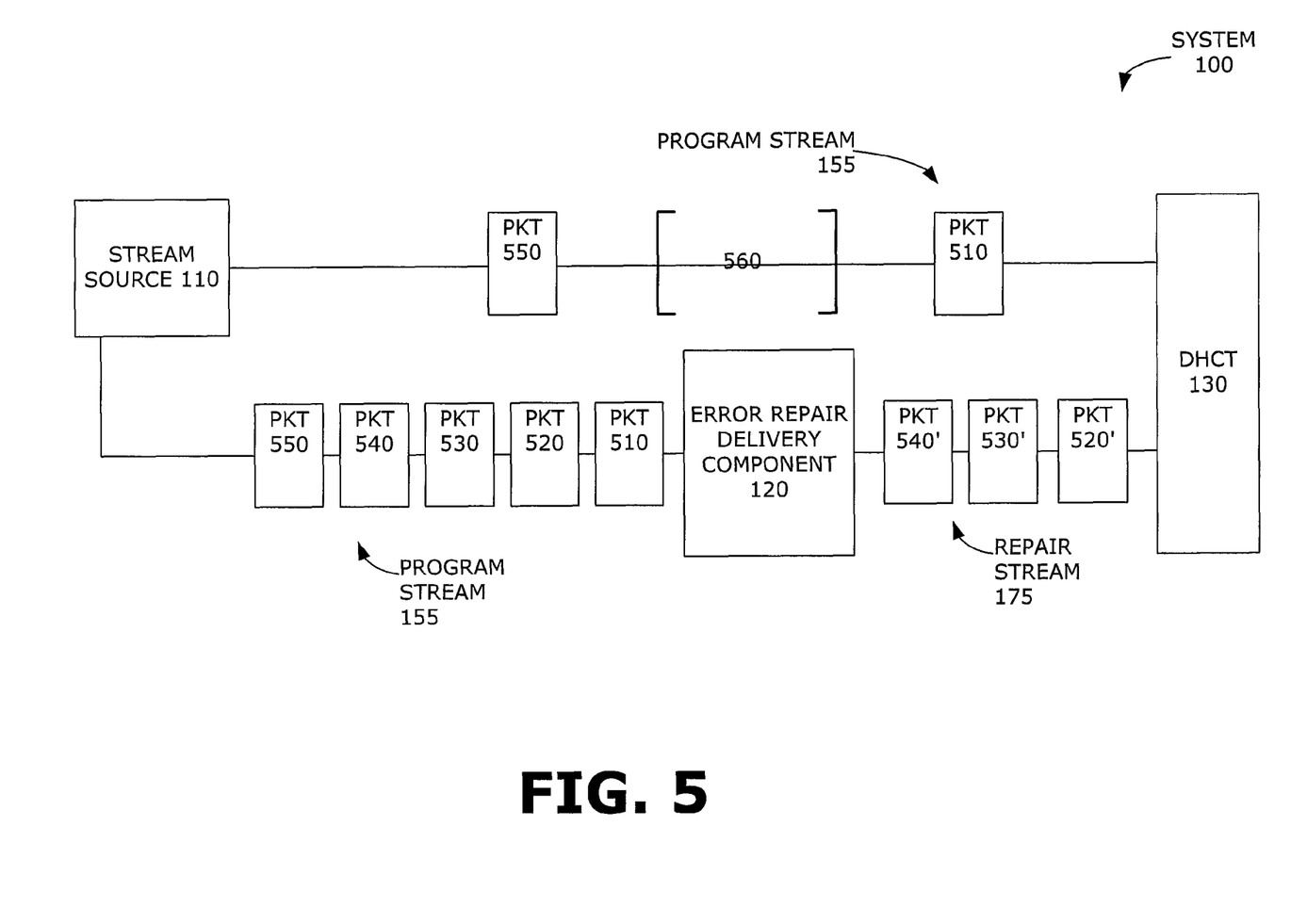
FIG. 5 is a data flow diagram illustrating interactions between the components of FIG. 1, in another example scenario.

FIG. 5 is a data flow diagram illustrating interactions between the components of FIG. 1 in another example scenario. Stream source 110 transmits a program stream 135 to DHCT 130. In this example scenario, the original program stream 135 at stream source 110 contains five packets 510-550, but DHCT 130 receives only two packets over logical channel 140. The missing packets 520-540 are not shown, but their absence is represented by bracket 560. DHCT 130 receives packet 510 with no errors. The next packet received by DHCT 130 is packet 550.

After DHCT 130 determines the number of, and identity of, the missing packets, DHCT 130 requests a segmented repair stream 175 from error repair delivery component 120. In this embodiment, the response from error repair delivery component 120 includes the transmission of segmented repair stream 175, which includes content corresponding to the missing packets, shown here as packets 520', 530', and 540'. Other embodiments may not provide a complete map of all errored or missing packets, and instead provide only the last received packet.

Figure 6:
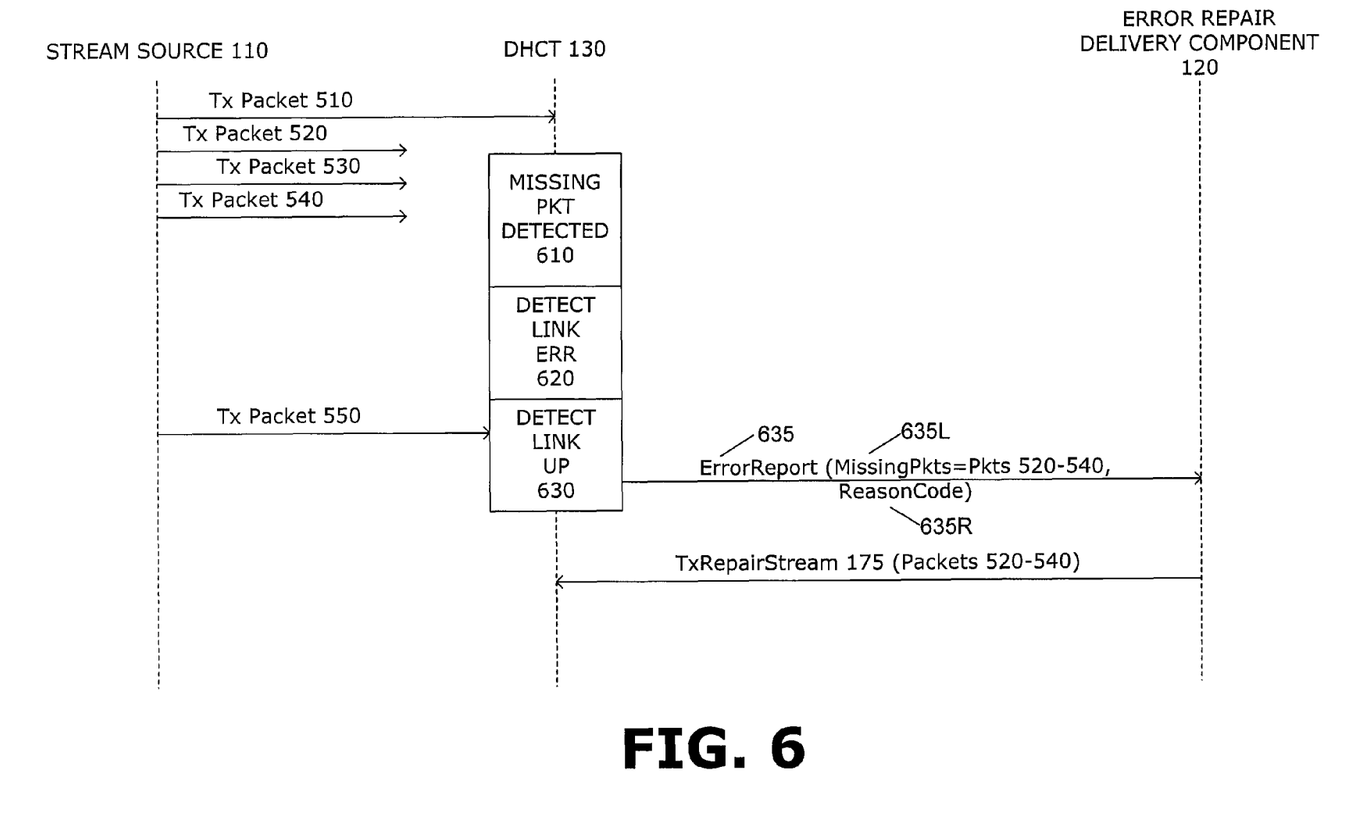
FIG. 6 is a message flow diagram showing more detail on the component interactions in the example scenario of FIG. 5.

FIG. 6 is a message flow diagram showing more detail on the component interactions in the example scenario of FIG. 5. Stream source 110 transmits five packets 510-550 destined for DHCT 130. However, DHCT 130 receives only two packets, 510 and 550. DHCT 130 determines (610) that packets 520-540 are missing (e.g., from a timeout), then detects (620) a subscriber link error. Later, DHCT 130 detects (630) the subscriber link is operating normally, and the packet 550 is received.

When the DHCT 130 is able to successfully communicate with error repair delivery component 120, DHCT 130 notifies error repair delivery component 120 of missing packets 520-540 through an error report 635. Error report 635 contains a missing packets list 635L and a reason code 635R. In this example scenario, the reason code indicates a subscriber link error.

Using the information in error report 635, error repair delivery component 120 provides a segmented repair stream 175 to DHCT 130. Segmented repair stream 175 includes the packets identified in the missing packets list 635L. In this example scenario, segmented repair stream 175 therefore contains packets 520-540. After DHCT 130 receives segmented repair stream 175, DHCT storage contains all seven packets, 510-570, allowing DHCT 130 to reconstruct the program stream 135 as originally transmitted by stream source 110.

Figure 7:
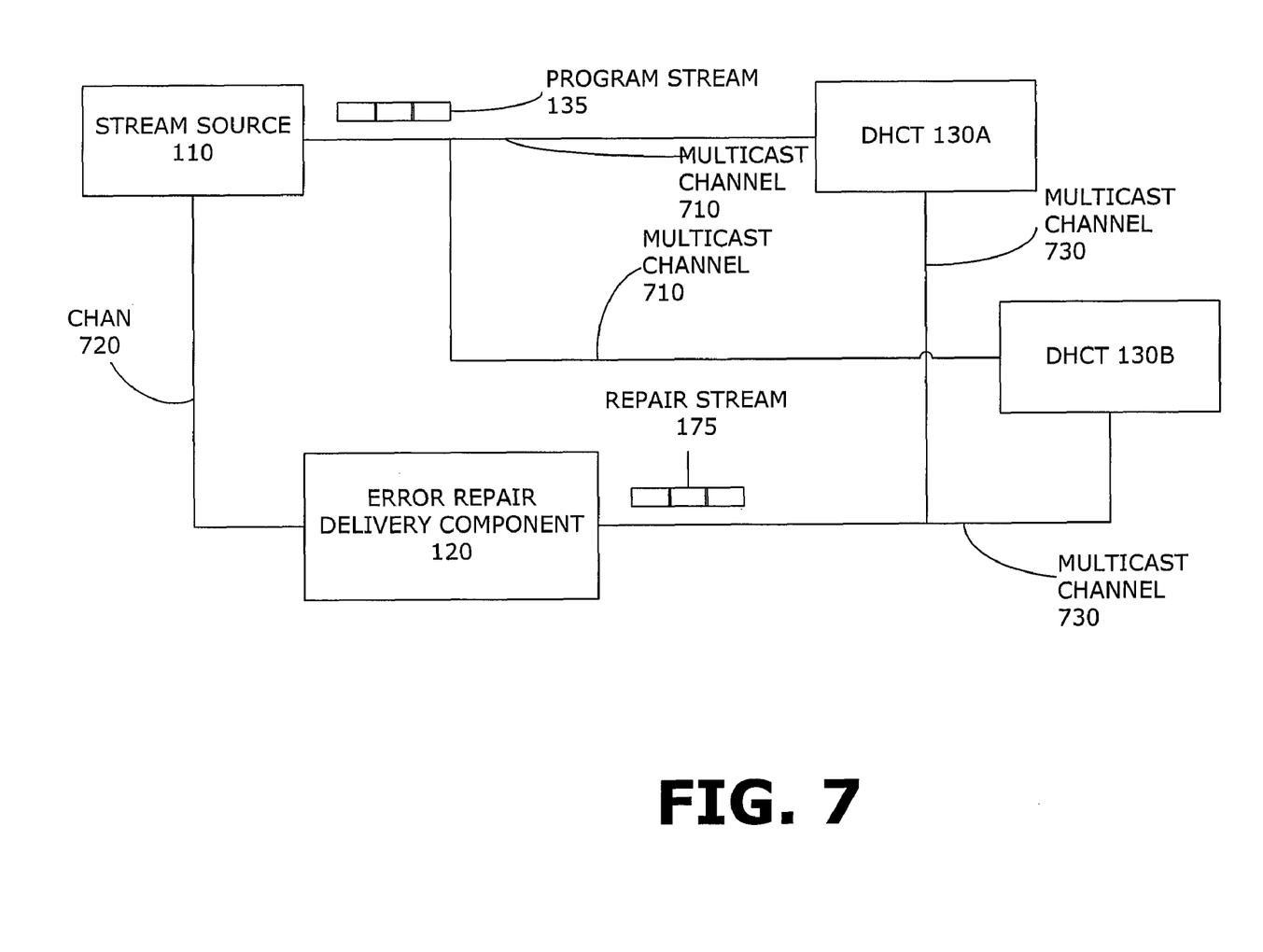
FIG. 7 is a block diagram illustrating the use of multicast addressing in some embodiments of the system of FIG. 1.

Multicast or unicast addressing techniques, or a combination of both, can be used to deliver program and repair streams. FIG. 7 is a block diagram illustrating the use of multicast addressing in some embodiments of the system of FIG. 1. In this example, stream source 110 uses a multicast channel 710 to deliver program stream 135 to a group of DHCTs, 130A and 130B. Error repair delivery component 120 receives the same program stream 135 over a different channel 720, which may be unicast or multicast. Error repair delivery component 120 uses a multicast channel 730 to deliver segmented repair stream 175 to DHCTs 130A and 130B. This configuration is useful, for example, when DHCT 130A and to DHCT 130B both experience the same set of missing or errored packets as a result of a single error or outage on the access network. Some embodiments of error repair delivery component 120 also multicast a control message to DHCTs 130, which silences error reports after a defined number of reports that describe the same error condition have been received.

Thus, in the embodiment of FIG. 7, error repair delivery component 120 accumulates error reports from multiple DHCTs 130 and determines whether a group of DHCTs 130 has reported a common set of missing or errored packets. If so, error repair delivery component 120 generates an appropriate segmented repair stream 175 and multicasts this single segmented repair stream 175 to the group of DHCTs 130. Note that it is not required that all DHCTs 130 missed the same subsegments of the program stream. By determining exactly which repair segments are placed in segmented repair stream 175, error repair delivery component 170 handles the case where one particular DHCT 130 missed a small subsegment, but multiple DHCTs 130 missed most of the program segments.

Figure 8:
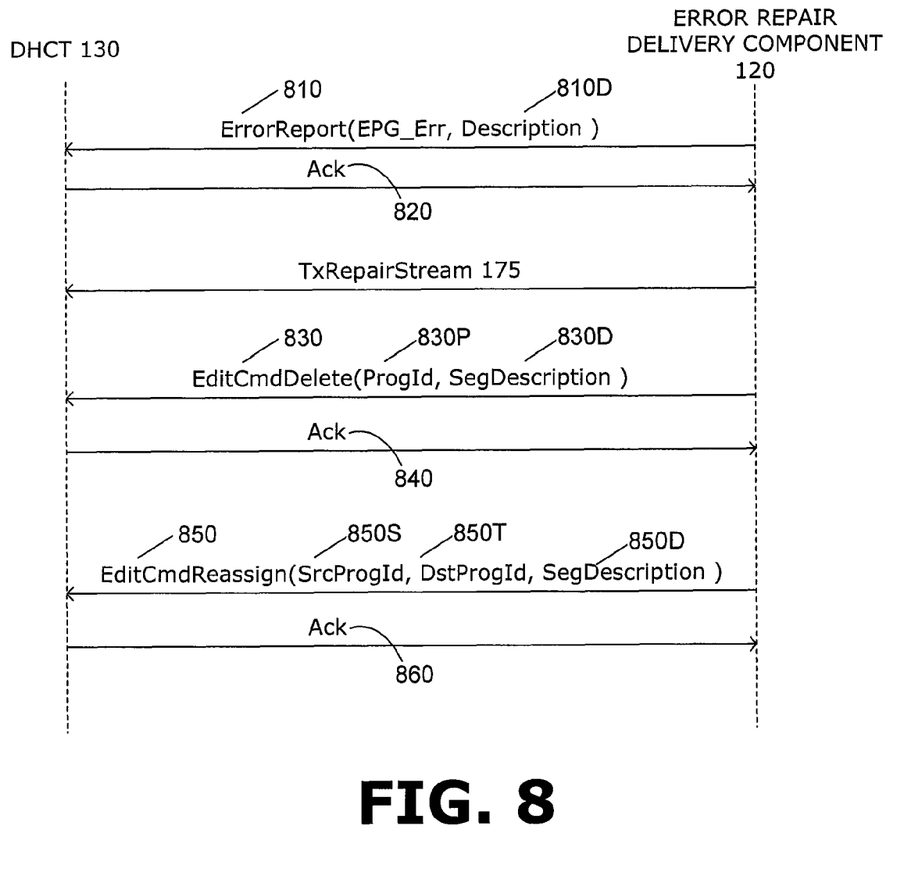
FIG. 8 is a message flow diagram illustrating interaction between various components of FIG. 1, in another example scenario.

FIG. 8 is a message flow diagram for a scenario in which segmented repair stream 175 is used for repairing errors that are a result of a program start time that differs from the start time in the published EPG schedule. In this example scenario, error repair delivery component 120 notifies DHCT 130, through message 810, that the published EPG schedule has an error, described by message field 810D. For example, message field 810D may indicate that the start time for "60 Minutes" is 7:09 instead of 7:00. It should be appreciated that such an EPG error can result in a program that is identified as "60 Minutes", but which starts with the last nine minutes of the previous program, and is missing the last nine minutes of "60 Minutes". The techniques disclosed herein address this problem as follows.

DHCT 130 acknowledges (820) the EPG schedule error message 810. In some embodiments, DHCT 130 acknowledges only after determining that one or more programs affected by the EPG schedule error are scheduled to be recorded. In some embodiments, DHCT 130 detects and reports an EPG schedule error to error repair delivery component 120, rather than vice versa.

In response to the acknowledgement, error repair delivery component 120 generates a segmented repair stream 175 containing the missing portion of the scheduled program (e.g., the last nine minutes of "60 Minutes") and delivers segmented repair stream 175 to DHCT 130. Error repair delivery component 120 also transmits one or more segment editing commands to be used in conjunction with segmented repair stream 175 to produce a correct version of the errored program. In some embodiments, delivery of segmented repair stream 175 is synchronous. In other embodiments, delivery of segmented repair stream 175 is asynchronous (e.g., delayed until resources are determined to be available).

In this example, error repair delivery component 120 transmits a segment editing command CmdDelete 830, which instructs DHCT 130 to delete received content. The delete command 830 contains a ProgramId parameter 830P, which identifies the affected program, and a SegmentDescriptor parameter 830D, which identifies the portion of the program to be deleted. In the example embodiment shown in FIG. 8, DHCT 130 acknowledges (840) the command, but other embodiments may not use acknowledgements for all commands.

Error repair delivery component 120 also transmits a segment editing command CmdReassign 850, which instructs DHCT 130 to reassign content from one program to another. The reassign command 850 contains a SrcProgramId parameter 850S and DstProgramId parameter 850T, which identify the source and destination programs, respectively, and a SegmentDescriptor parameter 830D, which identifies the portion of the program to be reassigned. In the example embodiment shown in FIG. 8, DHCT 130 acknowledges (860) the command, but other embodiments may not use acknowledgements for all commands. In one multicast embodiment, commands are identified with sequence numbers, and a "latest global command sequence number identifier" is periodically multicast, which allows DHCTs 130 to request retransmission of particular commands.

After receiving the original program stream for "60 Minutes" (not shown), the segmented repair stream 175, and the two commands 830 and 850, DHCT 130 processes the program and repair streams in conjunction with the segment editing commands, and produces a corrected version of the program "60 Minutes". Note that the timing of notification of the EPG schedule error is not tied to delivery of program stream 135, and so may occur before, during, or after delivery of program stream 135.

In another embodiment (not shown) the Segment Descriptor parameter in the segment editing commands (e.g., 830, 850) is used to identify advertisements or ad insertion placeholders within program stream 135. The error notification is also extended to indicate errors relating to advertising, such as "ad-not-targeted" or "ad-expired". In some "push" embodiments, these errors trigger error repair delivery component 120 to deliver segment editing commands and a segmented repair stream 175 that includes advertisements. In other "pull" embodiments, error repair delivery component 120 notifies DHCT 130 that a program ran long (e.g., editing command to "delete the first 9 minutes and mark the last 9 minutes as being missed"). DHCT 130 determines whether this data is needed or not (e.g., using EPG data), as well as how much bandwidth is available for recovery, and uses this knowledge to invoke appropriate repair operations.

DHCT 130 uses these advertisements in conjunction with segment editing commands to replace the existing advertisements or the placeholders in program stream 135, where the replacement advertisement can be of the same duration, or different. Segment editing commands also include insertion and deletion. A person of ordinary skill in the art should understand that various mechanisms can be used by DHCT 130 to identify advertisement segments, such as by network play time (NPT), or by segment descriptors.

Figure 9:
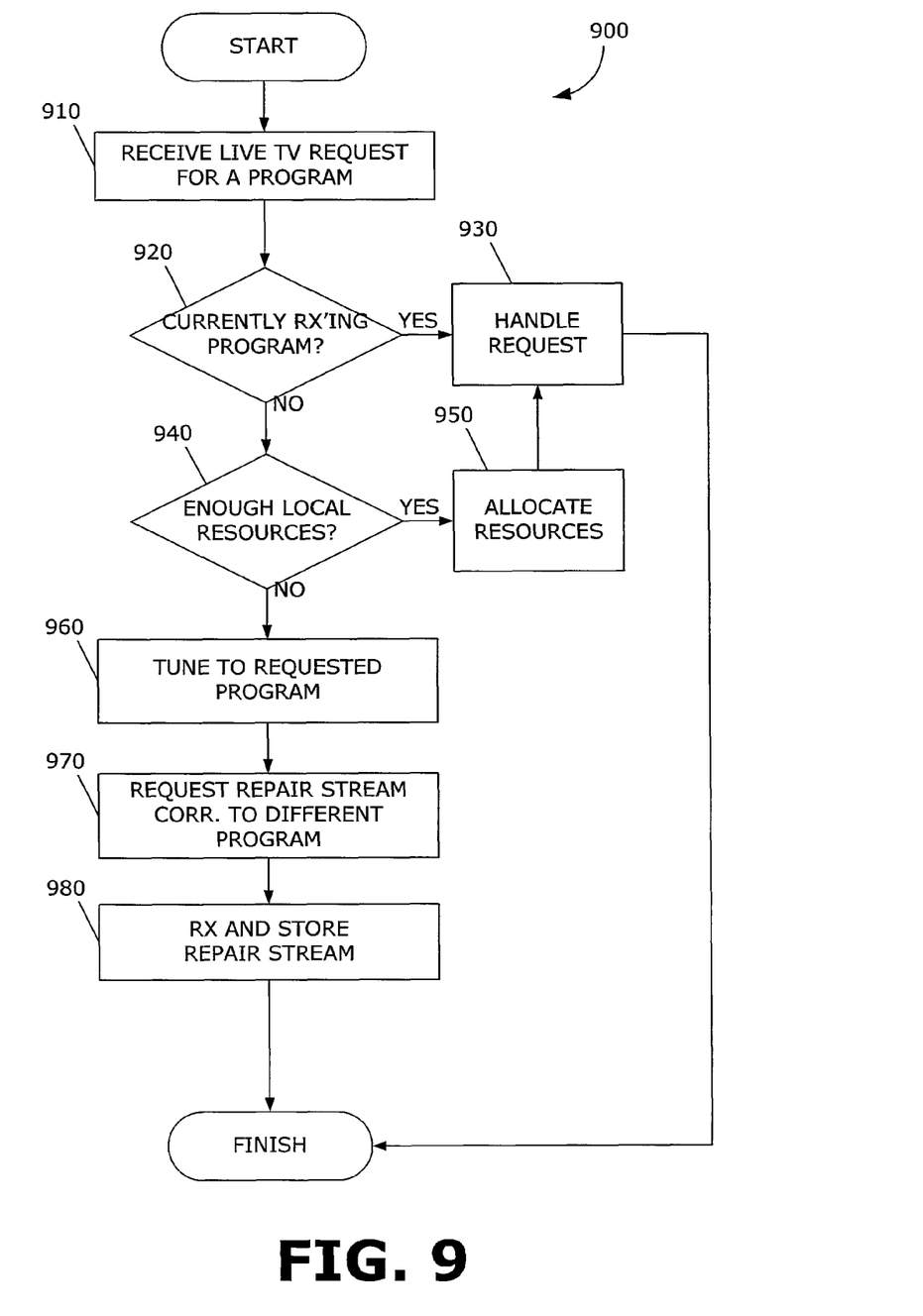
FIG. 9 is a flow chart of the repair logic in one embodiment of the DHCT from FIG. 1.

FIG. 9 is a flow chart of repair logic 190 in one embodiment of DHCT 130 from FIG. 1. In this embodiment, error repair delivery component 120 and repair logic 190 are used to implement toggling between multiple virtual tuners, all in record mode. In this disclosure, a "virtual tuner" refers to the capability in the DHCT to request that a program stream be generated, and be forwarded through the end-to end network (including access and home networks), where the DHCT includes sufficient resources to capture and process the stream, thus guaranteeing real-time delivery of service (for live or on-demand). The virtual tuner thus presents the same functionality of a physical tuner in a digital video recorder (DVR) (e.g., network play time; trick modes such as rewind, pause, and fast-forward, a rolling window of buffered data, etc.)

Process 900, implemented by repair logic 190, begins at block 910, which receives a user request to view and simultaneously record a particular channel (a feature commonly known as "Live TV"). Next, block 920 determines whether the channel requested by the user is already being received by a physical tuner. If Yes, then the request is handled at block 930 (e.g., display program, provide trick mode functionality, etc. Process 900 is then complete.

If the determination at block 920 is No (the channel requested by the user is not already being received), then block 940 determines whether or not sufficient local resources are available on DHCT 130 to fulfill the request. Examples of local resources include a physical tuner, network bandwidth, a decoder, processor cycles, storage space. If sufficient resources are available, then block 950 allocates resources appropriately. Processing continues with block 930 as described earlier.

If available local resources are not sufficient, then block 960 uses a physical tuner to tune to the requested stream (the one for which the user requested LiveTV). Next, block 970 requests, from error repair delivery component 120, a repair stream (175) corresponding to a stream which the user is currently receiving (and recording) but not viewing. Thus, the currently viewed ("LiveTV") program is switched to the physical tuner, and the non-viewed program is switched to the "virtual tuner" provided by error repair delivery component 120. Error repair delivery component 120 records the non-viewed program and, at a future point, distributes it to DHCT 130 as described above.

DHCT 130 identifies the program to be carried in the requested repair stream 175 in the request, for example by channel and network time or by program identifier (PID). The start time of the program is also identified, for example, by network play time (NPT). The repair stream 175 is then received and stored at block 980. In some embodiments, each instance of content (e.g., programs and advertisements) is identified with a globally unique event identifier. In this manner, repairs can be performed from the "next showing" of the exact same program. Reception and storage of repair stream 175 continues until the entire program has been received, at which time process 900 is finished.

Another embodiment of system 100, including Content Delivery System (CDS) 1000 (see FIG. 10) and repair logic 190, implements virtual storage in DHCT 130. DHCT 130 stores content locally in storage 150 until content is lost. Content may be lost, for example, when disk failures occur, storage 150 is full (i.e., some content is overwritten), or when a subscriber upgrades or replaces hard disk storage.

If a subscriber chooses to play back lost content, then repair logic 190 and error repair delivery component 120 cooperate to download the lost content as a repair stream. If a particular program includes some content that is still present in storage 150, and some content that has been overwritten, DHCT 130 presents the locally stored content to the user on request, and in parallel also retrieves the overwritten content as a repair stream. If the repair stream is not delivered fast enough to present to the user in real-time, the DHCT 130 may pause playback until the repair is complete. This feature allows a user to play back a virtual asset that is not locally stored. In other embodiments, the user can specifically request that a virtual asset is downloaded in the background, so that when the asset is finally played back, it is from local storage.

Another embodiment of system 100 including CDS 1000 (see FIG. 10) and repair logic 190, implements a network or remote DVR function. DHCT 130 stores content locally in storage 150 until storage 150 is full. When a program cannot be recorded because storage 150 is full, DHCT 130 stores the identity of the requested program, but does not treat this as an error, since the content can be retrieved later from error repair delivery component 120, as a repair stream.

When storage 150 is no longer full, repair logic 190 requests error repair delivery component 120 to provide the requested-but-not-locally-recorded program as a repair stream. In some embodiments, DHCT 130 lists both locally stored and remotely stored content when displaying a catalog of recorded content to the user (a "virtual catalog"), where a master copy of the virtual catalog is stored at a head-end.

In some embodiments, DHCT 130 communicates the virtual catalog to CDS 1000, along with popularity metrics describing the user's viewing habits. When storage resources become available, CDS 1000 distributes content to DHCT 130 based on knowledge of the virtual catalog (i.e., which programs the user understands to be available) as well as knowledge of which content is popular with the subscriber, with more popular content being downloaded sooner than less popular content. The speed and timing of repair stream downloads may vary, for example, less popular content can be downloaded during times at which few viewers are expected, or all repair streams can be downloaded immediately (e.g., if the user requests immediate downloads).

Figure 10:
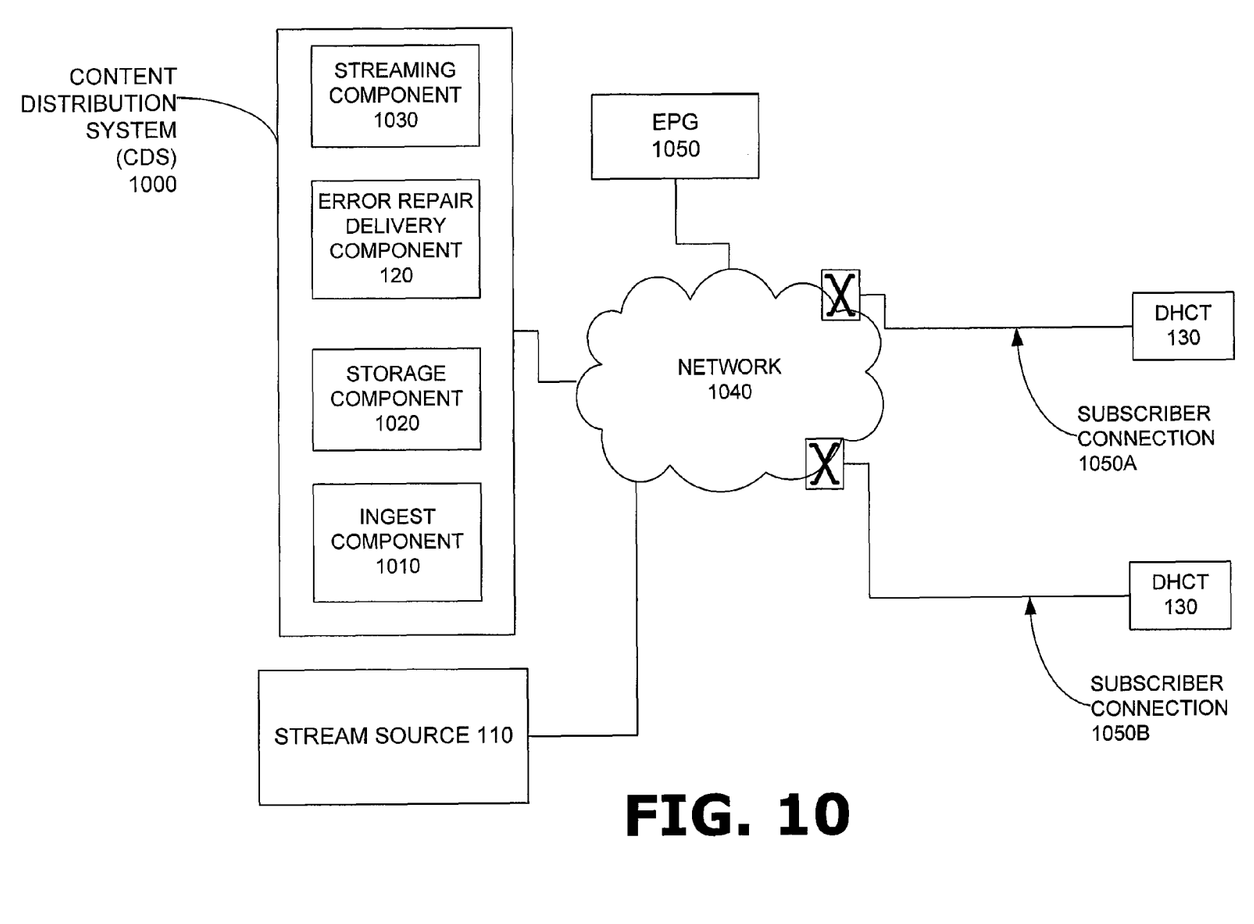
FIG. 10 is a block diagram of an example network architecture including utilizing the error repair delivery component and the DHCT of FIG. 1.

FIG. 10 is a block diagram of an example network architecture that utilizes error repair delivery component 120 and DHCT 130. In this example, error repair delivery component 120, is part of content distribution system (CDS) 1000. In addition to error repair delivery component 120 CDS 1000 includes an ingest component 1010, a storage component 1020, and a streaming component 1030.

Media streams are processed by these components as described above, and then delivered by network 1040 to DHCTs 130, over respective subscriber connections 1050A, 1050B. Examples of DHCT 130 include: a personal video recorder (PVR), also known as a digital video recorder (DVR); a home media center; and a residential gateway. These devices include similar recording and viewing capabilities, but differences in the amount of hardware resources (e.g., tuners, decoders, memory, processor cycles) allow the various devices to support different numbers of concurrent subscribers. An electronic program guide (EPG) source 1050 is also coupled to network 1040, and is in communication with CDS 1000 and DHCTs 130.

As should be appreciated by a person of ordinary skill in the art, the functionality of the components making up CDS 1000 can be distributed in various ways, including (but not limited to) a single server, an array of servers, or a distributed architecture with storage and streaming arrays. In the example architecture of FIG. 10, these components are located at the core of the network. However, a person of ordinary skill in the art should also appreciate that these components may be instead located at the edge of the network or somewhere near the middle (e.g., at a distribution hub).

Figure 11:
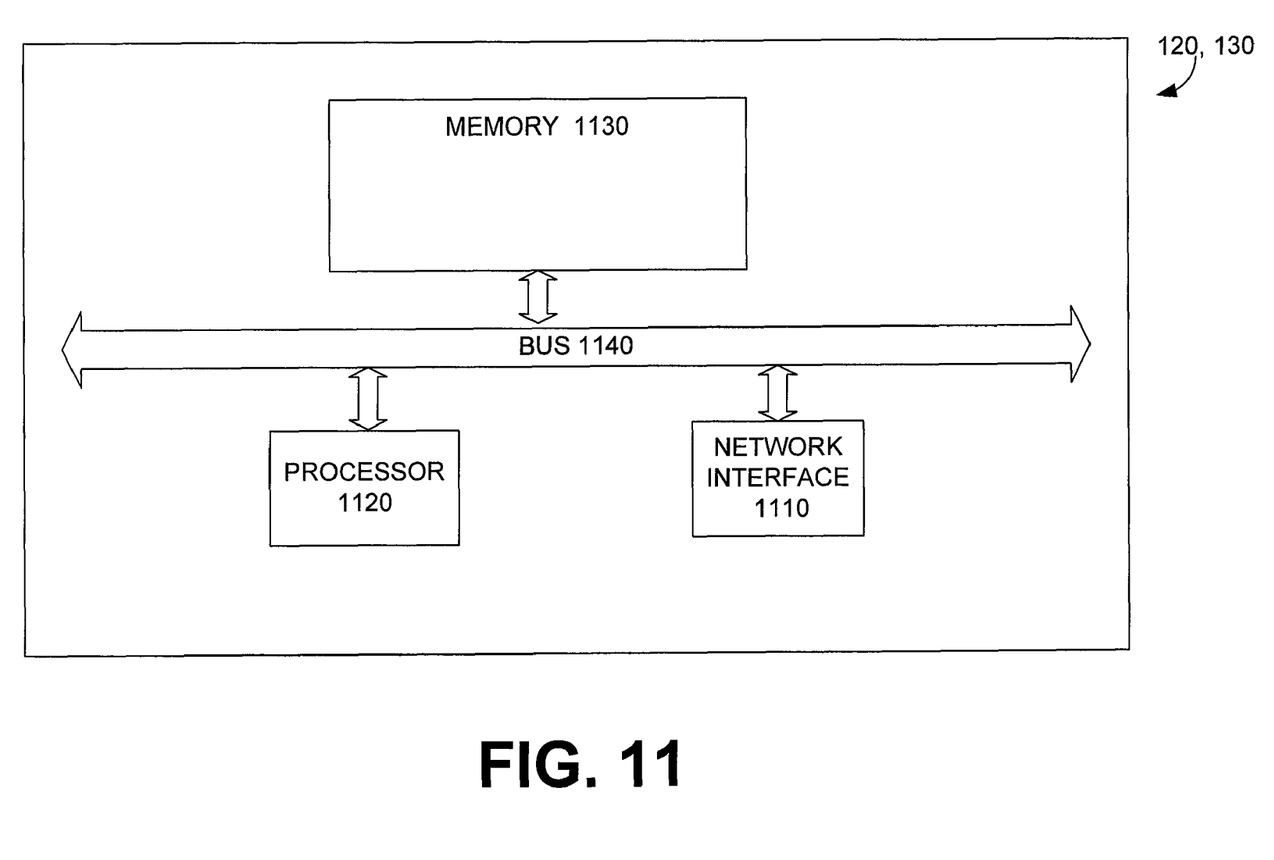
FIG. 11 is a block diagram showing selected components of a general-purpose computer than can be used to implement the DHCT or the error repair delivery component of FIG. 1.

FIG. 11 is a block diagram showing selected components of a general-purpose computer than can be used to implement DHCT 130 or error repair delivery component 120. DHCT 130/error repair delivery component 120 includes a network interface 1110; a processor 1120; and memory 1130. These components are coupled by a bus 1140. Memory 1130 contains instructions that are executed by processor 1120 to control operations of DHCT 130/error repair delivery component 120. DHCT 130/error repair delivery component 120 communicates with other components, such as error repair delivery component 120/DHCT 130, through network interface 1110. Omitted from FIG. 11 are a number of conventional components, known to those skilled in the art, that are unnecessary to explain the operation of the systems and methods of scaling just-in-time placement of advertising content disclosed herein.

A person of ordinary skill in the art should understand that software components referred to herein include executable code that is packaged, for example, as a standalone executable file, a library, a shared library, a loadable module, a driver, or an assembly, as well as interpreted code that is packaged, for example, as a class.

Any process descriptions or blocks in flowcharts should be understood as representing modules, segments, or portions of code which include one or more executable instructions for implementing specific logical functions or steps in the process. As would be understood by those of ordinary skill in the art of software development, alternate embodiments are also included within the scope of the disclosure. In these alternate embodiments, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) a compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The embodiments discussed, however, were chosen and described to illustrate the principles of the disclosure and its practical application to thereby enable a person of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly and legally entitled.

What is claimed is:

1. A method comprising:
    receiving a program stream from a program source on a first channel;
    detecting an unrecoverable error in the program stream, wherein detecting the unrecoverable error comprises detecting a condition of exceeding a size of a retransmission buffer in a retransmission function associated with the program stream;

receiving a standalone decodable repair stream from an error repair source on a second channel, the repair stream referring to a portion of the program stream, the portion corresponding to the unrecoverable error and received in less-than-real-time to accommodate the size of the retransmission buffer, wherein the portion corresponding to the unrecoverable error is received as a lower class of service than a class of service of the program stream, wherein receiving the portion corresponding to the unrecoverable error as the lower class of service comprises receiving an alternate portion corresponding to the unrecoverable error, the alternate portion having less content than the portion corresponding to the unrecoverable error; and combining the repair stream and the program stream to produce a presentable stream for user viewing at a delay based upon subscriber viewing behavior.

2. The method of claim 1, wherein the detecting an unrecoverable error further comprises: detecting a condition of exceeding a strength of a forward error correction (FEC) stream corresponding to the program stream.

3. The method of claim 1, wherein the method is implemented in a digital home communication terminal, and the detecting an unrecoverable error further comprises: detecting an outage of a link, the link located between the program source and the DHCT.

4. The method of claim 3, wherein the detecting an outage further comprises: detecting an outage of a subscriber link at the DHCT.

5. The method of claim 1, further comprising: requesting the standalone decodable repair stream.

6. The method of claim 1, further comprising: receiving the standalone decodable repair stream, responsive to the detecting.

7. The method of claim 1, further comprising: requesting the standalone decodable repair stream from the error repair source, responsive to the detecting.

8. The method of claim 1, wherein the second channel is a multicast stream.

9. The method of claim 1, wherein receiving the program stream further comprises toggling between multiple virtual tuners.

10. The method of claim 9, wherein toggling between multiple virtual tuners comprises:

requesting, via a digital home communication terminal (DHCT), the program stream be generated; and receiving, at the DHCT and through an end-to-end network, the program stream, wherein the DHCT has sufficient resources to capture and process the program stream.

11. An apparatus comprising:

memory having stored thereon program code; and a processor that is programmed by at least the program code to enable the apparatus to:

receive a program stream from a program source on a first channel;

detect an unrecoverable error in the program stream, the unrecoverable error comprising a condition of exceeding a size of a retransmission buffer in a retransmission function associated with the program stream;

receive a standalone decodable repair stream from an error repair source on a second channel, the repair stream referring to a portion of the program stream, the portion corresponding to the unrecoverable error and received in less-than-real-time to accommodate the size of the retransmission buffer, wherein the portion corresponding to the unrecoverable error is received as a lower class of service than a class of service of the program stream, wherein receiving the portion corresponding to the unrecoverable error as the lower class of service comprises receiving an alternate portion corresponding to the unrecoverable error, the alternate portion having less content than the portion corresponding to the unrecoverable error; and combine the repair stream and the program stream to produce a presentable stream for user viewing at a delay based upon user viewing behavior.

12. The apparatus of claim 11, wherein the processor is further programmed by at least the program code to enable the apparatus to: detect, as the unrecoverable error, a condition of exceeding a strength of a forward error correction (FEC) stream corresponding to the program stream.

13. The apparatus of claim 11, wherein the apparatus comprises a digital home communication terminal (DHCT), and the processor is further programmed by at least the program code to enable the apparatus to: detect an outage of a link, the link located between the program source and the DHCT.

14. The apparatus of claim 11, wherein the apparatus comprises a digital home communication terminal (DHCT), and the processor is further programmed by at least the program code to enable the apparatus to: detect an outage of a subscriber link at the DHCT.

15. An apparatus comprising:

means for receiving a program stream from a program source on a first channel;

means for detecting an unrecoverable error in the program stream, the unrecoverable error comprising a condition of exceeding a size of a retransmission buffer in a retransmission function associated with the program stream;

means for receiving a standalone decodable repair stream from an error repair source on a second channel, the repair stream referring to a portion of the program stream, the portion corresponding to the unrecoverable error and received in less-than-real-time to accommodate the size of the retransmission buffer, wherein the portion corresponding to the unrecoverable error is received as a lower class of service than a class of service of the program stream, wherein the means for receiving the portion corresponding to the unrecoverable error as the lower class of service comprises means for receiving an alternate portion corresponding to the unrecoverable error, the alternate portion having less content than the portion corresponding to the unrecoverable error; and means for combining the repair stream and the program stream to produce a presentable stream for user viewing at a delay based upon user viewing behavior.

16. The apparatus of claim 15, further comprising: means for requesting the standalone decodable repair stream.

17. The apparatus of claim 15, further comprising: means for receiving the standalone decodable repair stream, responsive to the detecting.

18. The apparatus of claim 15, further comprising: means for requesting the standalone decodable repair stream from the error repair source, responsive to the detecting.

* * * * *